4 Sheets—Sheet 1.

D. H. KARNS & J. REAM.
Grain Cleaner and Scourer.

No. 201,251. Patented March 12, 1878.

WITNESSES:
C Clarence Poole
Rich.d K Evans

INVENTORS
David H. Karns
John Ream
per atty.
A. H. Evans & Co.

D. H. KARNS & J. REAM.
Grain Cleaner and Scourer.

No. 201,251. Patented March 12, 1878.

4 Sheets—Sheet 3.

D. H. KARNS & J. REAM.
Grain Cleaner and Scourer.

No. 201,251. Patented March 12, 1878.

WITNESSES:
C. Clarence Poole
Rich d K. Evans.

INVENTORS
David H. Karns
John Ream
Per atty A. H. Evans & Co

4 Sheets—Sheet 4.

D. H. KARNS & J. REAM.
Grain Cleaner and Scourer.

No. 201,251. Patented March 12, 1878.

WITNESSES:
C. Clarence Poole
Rich. K. Evans

INVENTORS
David H. Karns
John Ream
per atty A. H. Evans & Co.

UNITED STATES PATENT OFFICE.

DAVID H. KARNS, OF WILLIAMSPORT, MARYLAND, AND JOHN REAM, OF BEDINGTON, WEST VIRGINIA.

IMPROVEMENT IN GRAIN CLEANERS AND SCOURERS.

Specification forming part of Letters Patent No. 201,251, dated March 12, 1878; application filed January 30, 1878.

*To all whom it may concern:*

Be it known that we, DAVID H. KARNS, of Williamsport, Washington county, State of Maryland, and JOHN REAM, of Bedington, Berkeley county, State of West Virginia, have invented a new and useful Improvement in Machinery for Cleaning Wheat and other cereals, of which the following is a clear, full, and exact description, reference being had to the accompanying drawings, making a part of this specification, in which—

Figure 1:
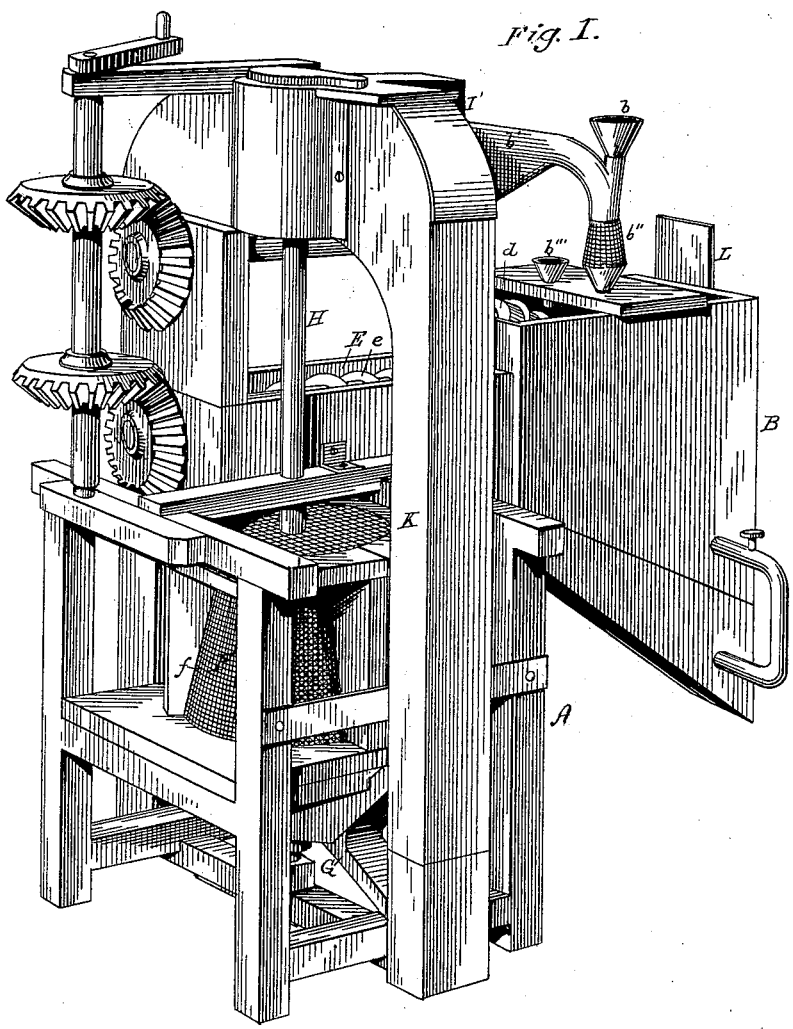
Figure 2:
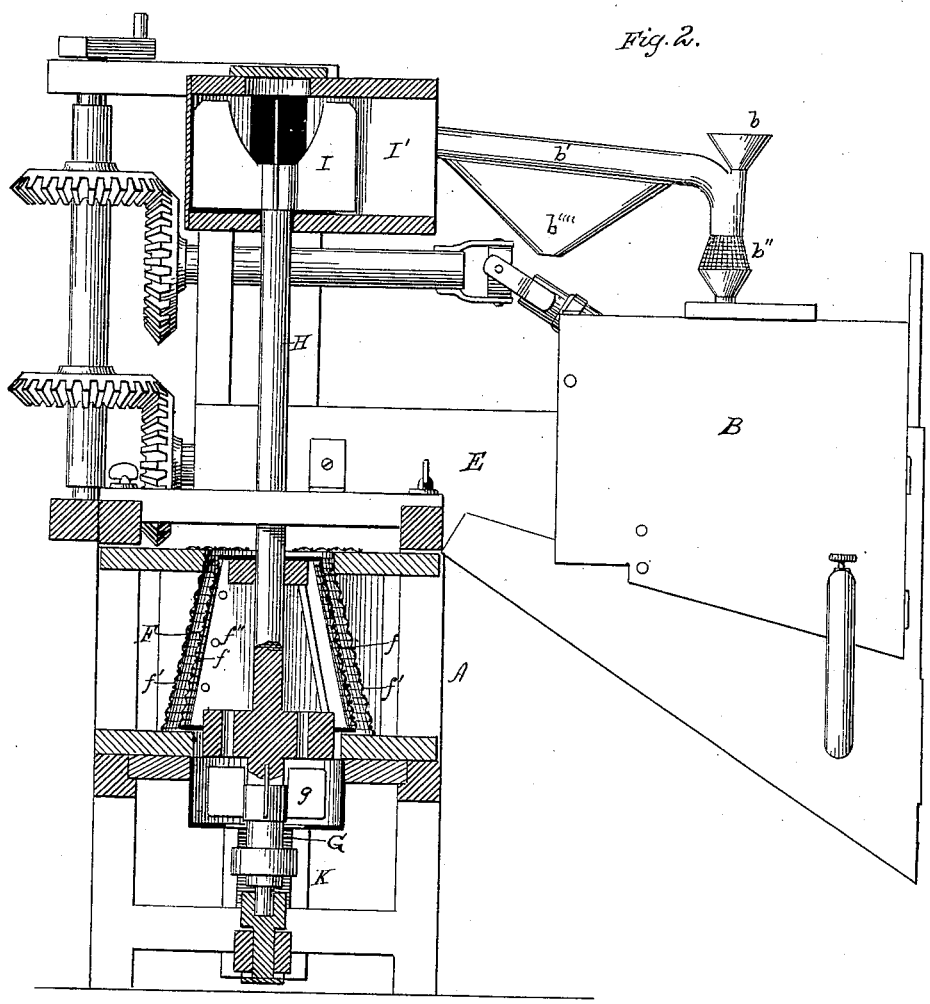
Figure 3:
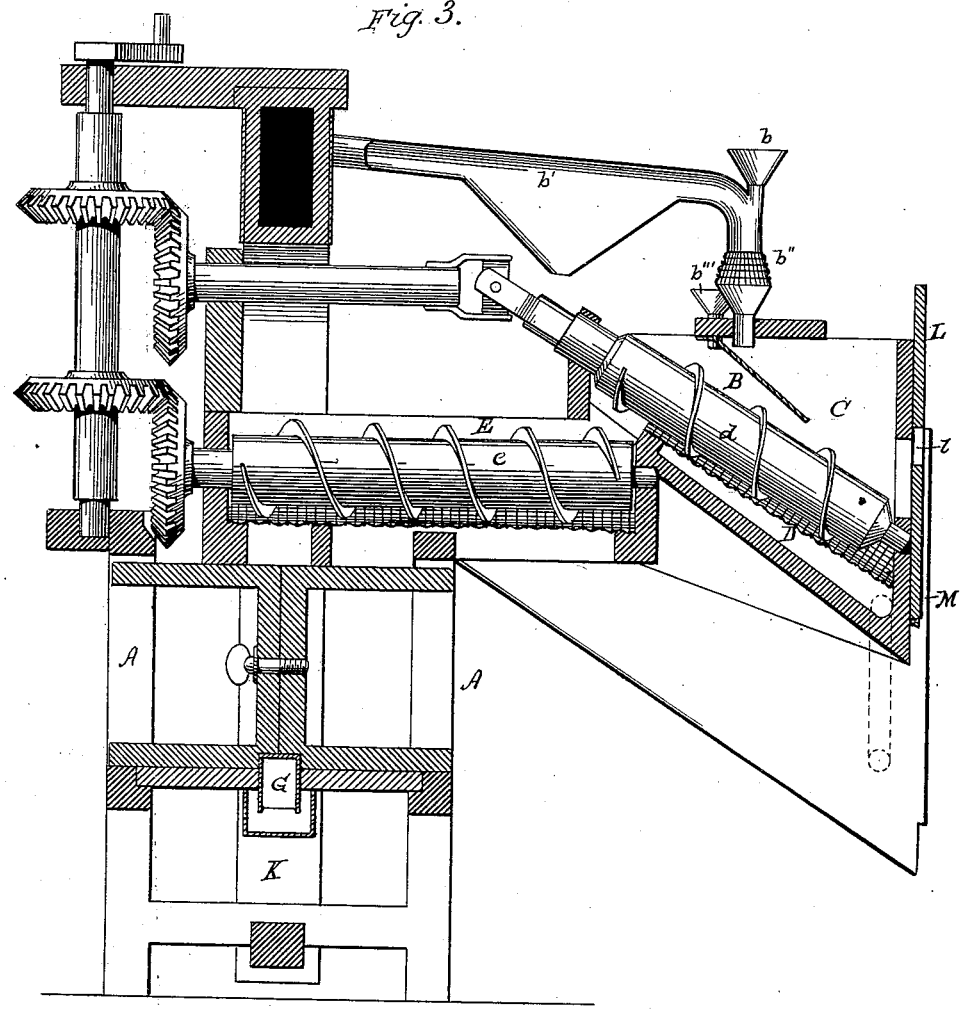
Figure 4:
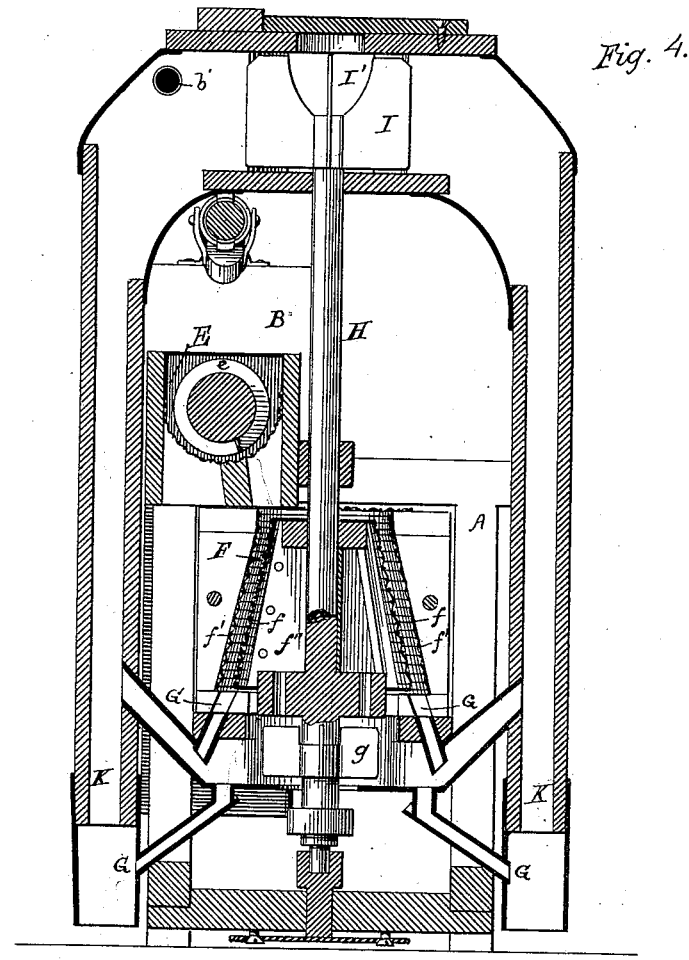
Figure 5:
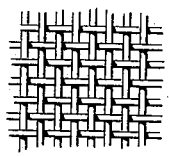

Figure 1 is a perspective view of a grain-cleaner with our improvements attached. Fig. 2 is a longitudinal vertical section. Fig. 3 is a longitudinal vertical section, showing the scouring-cylinders. Fig. 4 is a vertical cross-section, showing the fan and suction-pipes. Fig. 5 shows the size of the wire-cloth used in a full-sized machine.

The object of our invention is to cleanse the berry of the wheat and strip off its coating of silex, leaving exposed the gluten coating enveloping the body of the starch; and it consists of the novel combinations of devices hereinafter described and claimed.

To enable others skilled in the art to make and use our invention, we will proceed to describe the exact manner in which we have carried it out.

In the drawings, A A represent the framework for supporting our machine, and B the compartment in which the grain is first washed and cleaned of all impurities of less specific gravity than the berry of the grain itself. The grain is introduced through the hopper $b$ into the cleansing-chamber C, which is provided with an inclined bottom, D, made of wire-cloth. Along this bottom lies the inclined conveyer $d$, which raises the washed grain from the chamber C, and passes it into horizontal chamber E, also provided with a wire-cloth bottom and with the conveyer $e$, by which the grain is passed over the wire-cloth to the rear of the chamber, thus allowing the grain an opportunity to drain and dry, besides being further cleansed by its necessary contact with the wire bottom in its passage through the chamber. These conveyers are operated by the ordinary bevel-gearing, as shown in Fig. 2.

At the rear end of the chamber E the grain is allowed to fall through an opening into the conical chamber F, where it is caught between the revolving cone $f$, made of wire-cloth, (see Fig. 5,) and the outer casing $f''$, made of the same material. During the downward passage of the berry between these two wire surfaces it is thoroughly stripped of its silex coat, leaving the berry unbroken and the gluten coat exposed.

The quantity of grain which may be passed through the chamber F is only limited by the speed of the machine, as the berry is free from injury in the operation however rapidly the machine may be run. When the grain has passed the chamber F, and been thoroughly cleansed of its silex coat, it is passed out again through the spouts G G, and in a few hours is ready for the mill.

During the progress of cleansing the wheat we subject the grain to the action of suction and blast fans at several different points of the operation, which not only assists in cleaning the grain from its light impurities, but also cools and dries the grain after the operation of washing has been gone through with. On the upper end of the main vertical shaft H, by which is operated the revolving cone in the chamber F, we place the suction-fan I, connected with the hopper $b$ by the pipe $b'$, while immediately below the point of connection are openings $b''$ for the admission of atmospheric air. The effect of this arrangement will be to subject the falling grain at this point to the action of the suction-fan, and force the light foreign substances through the pipe $b'$ into the fan-chamber and out through the discharge-opening I'. Also, within the revolving cone $f$ is a blast-fan, $f'''$, which revolves with cone, and tends to dry the berry, and, by the outward blast through the open wire material of the cone and case, to keep the meshes of the cone free for action, and drive out any remaining dust through the meshes of the outer casing $f'$. This fan receives its air through the wire-cloth covering on the top of the cone.

As the grain passes from the chamber F to the spouts G G, it is subjected to the blast-fan $g$, operated by the main shaft H; and, again, as the cleaned berry is finally discharged from the chamber F through the pipes G G, it is met by the suction-draft through the vertical pipes K K, by which any remaining particle of foreign matter is carried to the fan-chamber and discharged.

The water is admitted to the compartment B through the opening $b'''$, and its height in the compartment is controlled and regulated by the adjustable sliding gate L, provided with a sluiceway, $l$, through which the water escapes, carrying off the light material down through the pipe M.

Having thus described our invention, what we claim as new, and desire to secure by Letters Patent, is—

1. The compartment B, provided with the cleansing-chamber C, having an inclined wire-cloth bottom, D, adjustable sluice-gate L, and inclined conveyer $d$, in combination with its operating mechanism, substantially as and for the purpose set forth.

2. The suction-fan I, in combination with the pipe $b'$, having depression $b''''$, and hopper $b$, provided with the air-openings $b''$, the several parts being relatively arranged and operated substantially as and for the purpose set forth.

DAVID H. KARNS.
JOHN REAM.

Witnesses:
J. L. BUSKETT,
GEO. H. EVANS.